United States Patent
Bates et al.

(10) Patent No.: US 8,180,950 B2
(45) Date of Patent: May 15, 2012

(54) APPARATUS AND METHOD TO MANAGE INFORMATION USING AN OPTICAL AND HOLOGRAPHIC DATA STORAGE MEDIUM

(75) Inventors: Allen Keith Bates, Tucson, AZ (US); Susan Encinas, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 11/763,913

(22) Filed: Jun. 15, 2007

(65) Prior Publication Data
US 2008/0313395 A1    Dec. 18, 2008

(51) Int. Cl.
*G11C 13/04* (2006.01)

(52) U.S. Cl. ............. 711/101; 726/27; 369/44.114; 720/666; 365/125

(58) Field of Classification Search .......... 711/101
See application file for complete search history.

(56) References Cited

U.S. PATENT DOCUMENTS

| | | | |
|---|---|---|---|
| 4,135,206 A * | 1/1979 | Kleuters et al. ........... | 369/44.15 |
| 4,365,323 A * | 12/1982 | Heemskerk et al. ....... | 369/44.13 |
| 5,414,451 A | 5/1995 | Sugiyama et al. | |
| 5,905,708 A | 5/1999 | Richter | |
| 6,154,432 A | 11/2000 | Farugi et al. | |
| 6,825,960 B2 * | 11/2004 | Curtis et al. ................ | 359/35 |
| 6,856,589 B2 | 2/2005 | Hirotsune et al. | |
| 7,072,283 B2 | 7/2006 | Hirotsune et al. | |
| 7,315,946 B1 * | 1/2008 | Blumenfeld et al. ....... | 713/175 |
| 2003/0031112 A1 * | 2/2003 | Horimai ....................... | 369/244 |
| 2004/0194151 A1 * | 9/2004 | Earhart ......................... | 725/135 |
| 2004/0252832 A1 * | 12/2004 | Domjan et al. .............. | 380/200 |
| 2006/0109774 A1 * | 5/2006 | Horimai et al. ............. | 369/275.1 |
| 2006/0114792 A1 * | 6/2006 | Uno et al. .................... | 369/103 |
| 2006/0136958 A1 | 6/2006 | LeBlanc, III, Jr. | |
| 2006/0171284 A1 * | 8/2006 | Matsumoto et al. ........ | 369/103 |
| 2006/0181999 A1 * | 8/2006 | Knittel et al. ............... | 369/103 |
| 2007/0211320 A1 * | 9/2007 | Toishi et al. ................. | 359/15 |
| 2009/0059763 A1 * | 3/2009 | Kamada et al. ............. | 369/103 |

OTHER PUBLICATIONS

Hideyoshi Horimai and Xiaodi Tan. "Advanced Collinear Holography." Mar. 2005. The Optical Society of Japan. Optical Review. vol. 12. No. 2. pp. 90-92.*
Y. Kaneko. "Holographic Versatile Disc System." Oct. 2006. Media-Tech Conference. http://www.media-tech.net/fileadmin/templates/resources/sc06/mtc06_keynote_day2_kaneko.pdf.*

* cited by examiner

*Primary Examiner* — Reginald Bragdon
*Assistant Examiner* — Nathan N Sadler
(74) *Attorney, Agent, or Firm* — Dale F. Regelman; Quarles & Brady LLP

(57) ABSTRACT

A hybrid optical and holographic data storage medium is disclosed. In addition, a method is disclosed to manage information using that optical and holographic data storage medium. The method reads information from the optical data storage layer before reading data from, or writing data to, the holographic data storage layer.

20 Claims, 10 Drawing Sheets

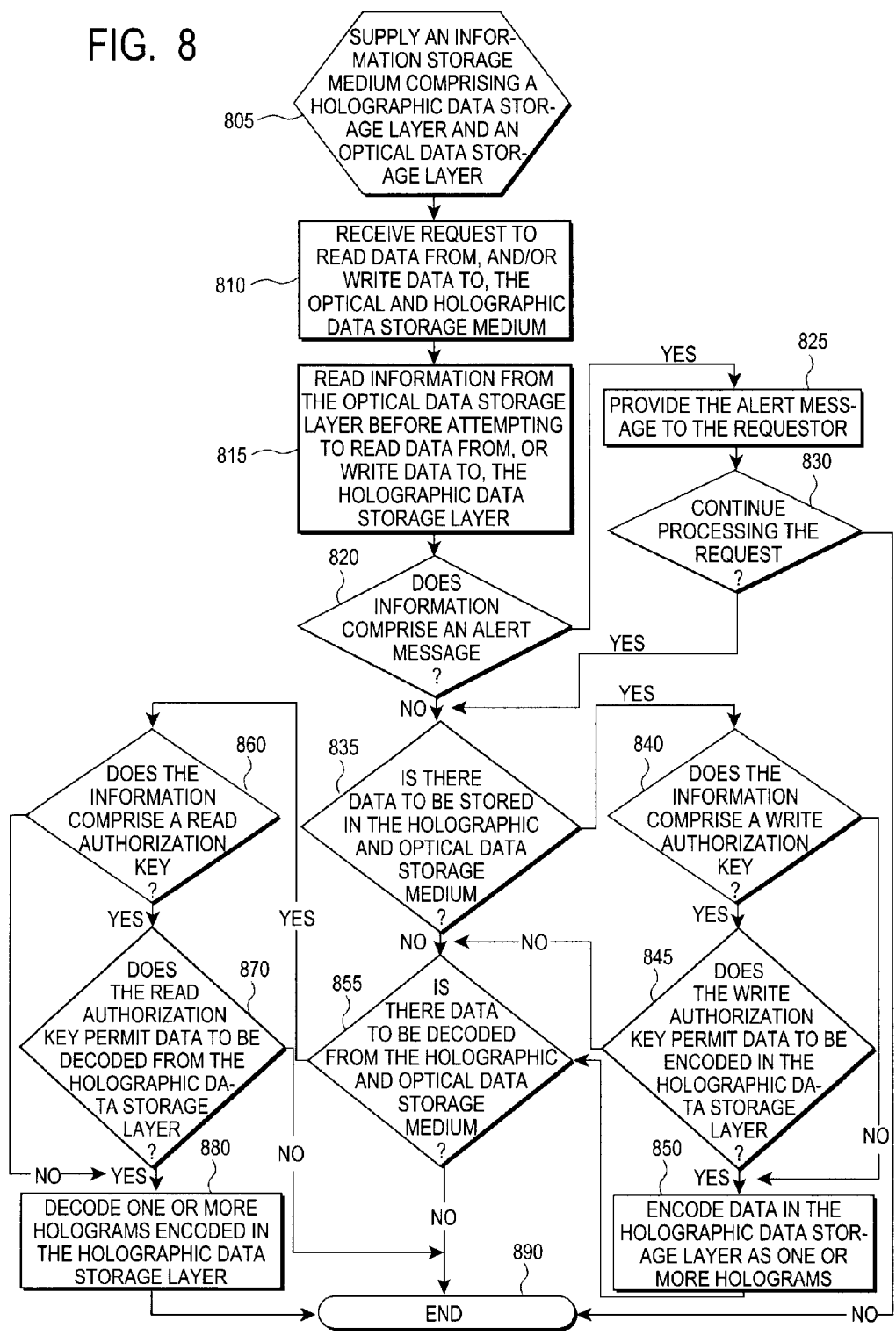

APPARATUS AND METHOD TO MANAGE INFORMATION USING AN OPTICAL AND HOLOGRAPHIC DATA STORAGE MEDIUM

FIELD OF THE INVENTION

This invention relates to an apparatus and method to manage information using an optical and holographic data storage medium.

BACKGROUND OF THE INVENTION

In holographic information storage, an entire page of information is stored at once as an interference pattern within a thick, photosensitive material comprising a holographic data storage layer. This is done by intersecting two coherent laser beams within the storage layer. The first, called the data beam, contains the information to be stored; the second, called the reference beam, is designed to be simple to reproduce, for example a simple collimated beam with a planar wavefront.

The resulting interference pattern causes chemical and/or physical changes in the photosensitive medium: a replica of the interference pattern is stored as a change in the absorption, refractive index, or thickness of the photosensitive medium.

When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

Optical drives, including CD and DVD drives, detect variations in the optical properties in the surface of an optical data storage layer. Such optical drives direct a light beam onto that surface and detect either the presence or absence of a corresponding reflected beam.

SUMMARY OF THE INVENTION

Applicants' invention comprises an apparatus and method to manage information using an optical and holographic data storage medium. The method supplies an optical and holographic information storage medium comprising a holographic data storage layer and an optical data storage layer. The method reads information from the optical data storage layer before reading data from, or writing data to, the holographic data storage layer.

BRIEF DESCRIPTION OF THE DRAWINGS

The invention will be better understood from a reading of the following detailed description taken in conjunction with the drawings in which like reference designators are used to designate like elements, and in which:

FIG. 8 is a flow chart summarizing the steps of a first embodiment of Applicants' method.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
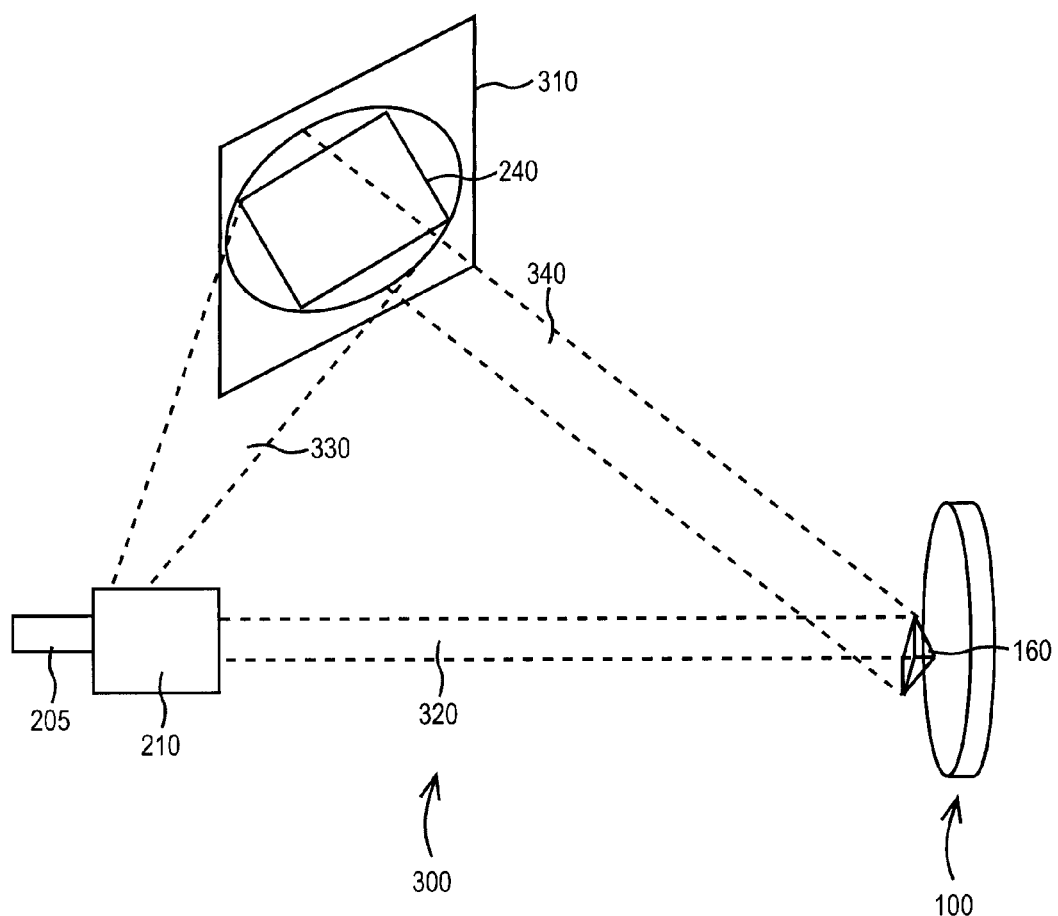
FIG. 3 is a block diagram showing a holographic data storage system being used to encode information in Applicants' optical and holographic data storage medium.
Figure 4A:
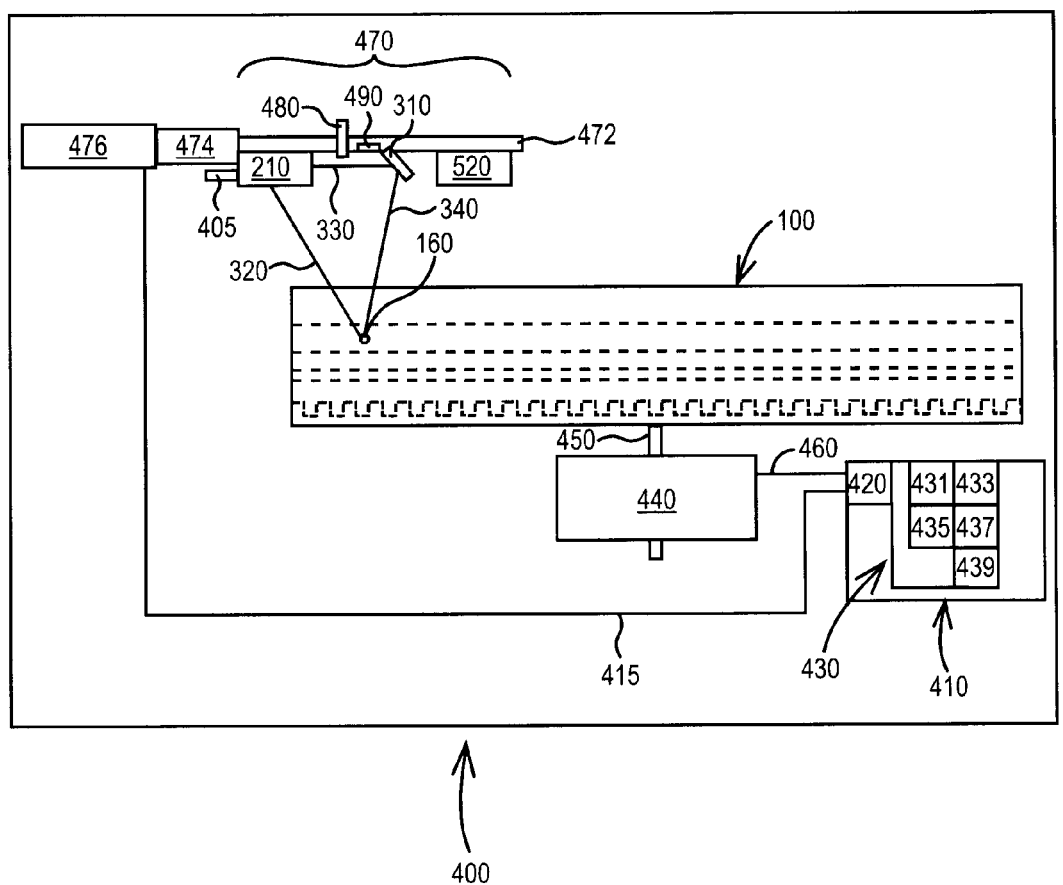
FIG. 4A is a block diagram showing the elements of FIG. 3 disposed in Applicants' optical and holographic drive, wherein a read/write head is shown using a first lasing device to encode a hologram into the holographic data storage portion of Applicants' optical and holographic data storage medium.
Figure 4B:
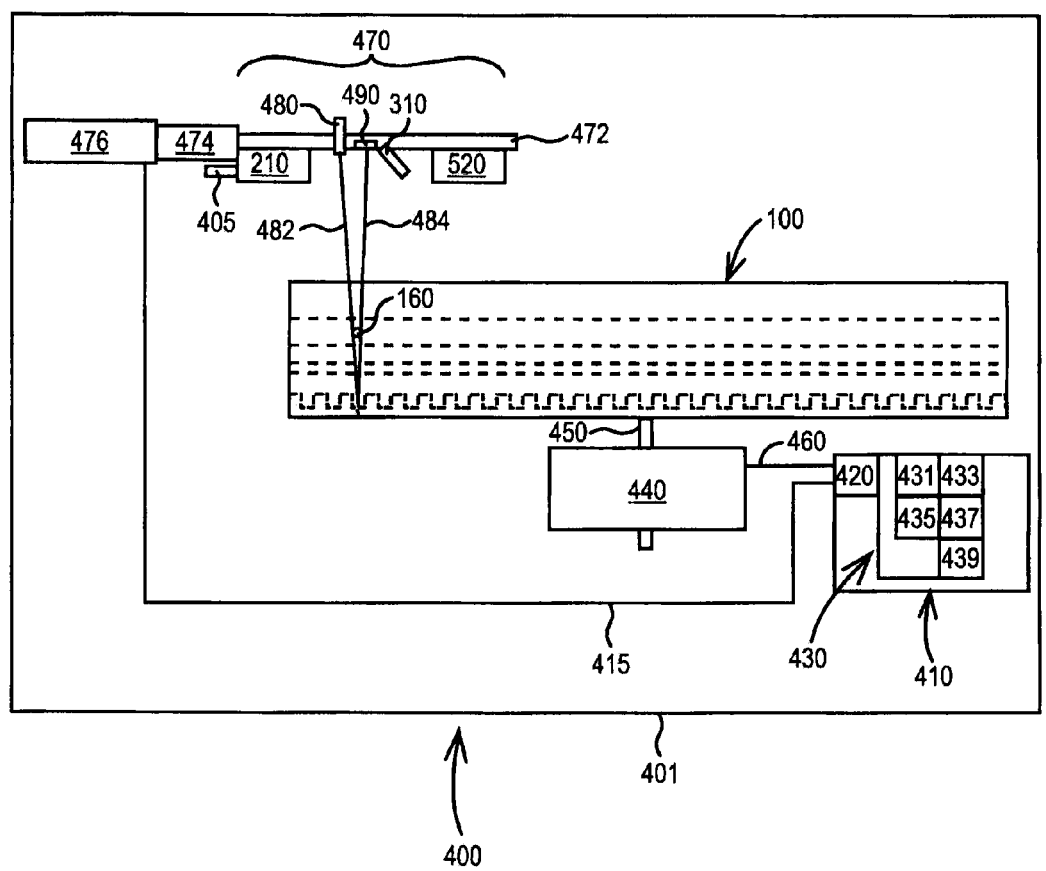
FIG. 4B is a block diagram showing the read/write head of FIG. 4A using a second lasing device to read information encoded in the optical medium portion of Applicants' optical and holographic data storage medium.
Figure 5:
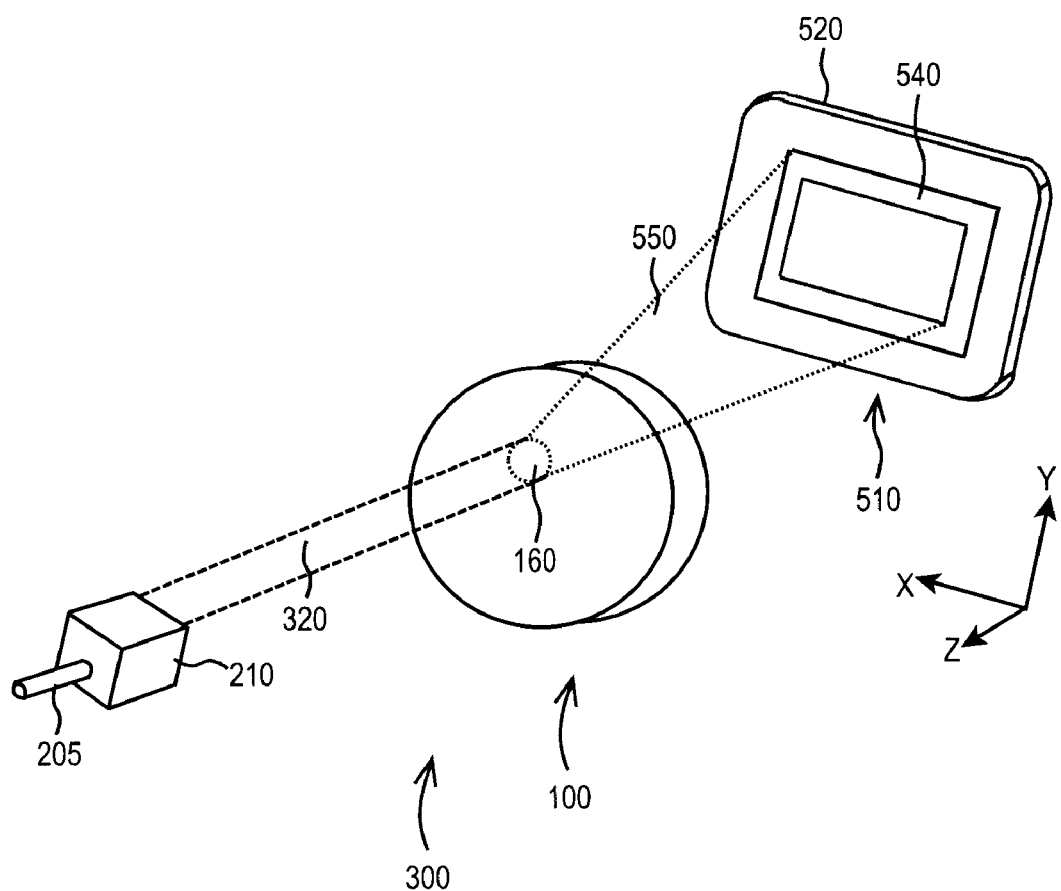
FIG. 5 is a block diagram showing a holographic data storage system being used to decode information encoded in Applicants' optical and holographic data storage medium.

Referring now to FIGS. 3 and 5, holographic data storage system 300 comprises lasing device 205, beam splitter 210, reflective spatial light modulator 310 (FIGS. 3, 4A, 4B, 6A, 6B), holographic storage medium 100, and optical sensor array 510 (FIG. 5) which comprises input screen 520 (FIGS. 4A, 4B, 5, 6A, 6B). The light generated by source 205 is split by beam splitter 210 into reference beam 320, and carrier beam 330.

In the illustrated embodiment of FIG. 3, reflective spatial light modulator ("RSLM") 310 displays image 240. In certain embodiments, reflective spatial light modulator 310 comprises an assembly comprising a plurality of micro mirrors. In other embodiments, reflective spatial light modulator 310 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 330 picks up image 240 as the light is reflected off reflective spatial light modulator 310 (FIGS. 3, 4A, 4B, 6A, 6B) to form reflected data beam 340 comprising image 240. Unreflected reference beam 320 interferes with reflected data beam 340 to form hologram 160 (FIGS. 2, 4A, 4B, 5, 6A, 6B). Hologram 160 is encoded into optical holographic data storage medium 100 as an interference pattern. That optical interference pattern causes chemical and/or physical changes in the photosensitive medium: a replica of the interference pattern is stored as a change in the absorption, refractive index, or thickness of the photosensitive medium.

FIG. 5 illustrates holographic data storage system 300 decoding the interference pattern comprising the encoded hologram 160 stored in media 100. Input screen 520 (FIGS. 4A, 4B, 5, 6A, 6B) is disposed a distance away from holographic storage medium 100 sufficient to digitally capture the reconstructed data beam 550 projected upon it. To decode the interference pattern comprising hologram 160 (FIGS. 2, 4A, 4B, 5, 6A, 6B), reference beam 320 is incident on the encoded holographic storage medium 100. As the reference beam 320 interferes with the interference pattern 160, a reconstructed data beam 550 is generated, wherein that reconstructed data beam 550 comprises an image 540 resembling the original image 240. Optical sensor array 510 (FIG. 5) digitally captures the information comprising image 540 on input screen 520.

Referring now to FIG. 4A, in certain embodiments lasing device 405, beam splitter 210, reflective spatial light modulator 310 (FIGS. 3, 4A, 4B, 6A, 6B), and input screen 520, are disposed within optical holographic drive apparatus 400. In the illustrated embodiment of FIG. 4A, optical holographic drive apparatus 400 further comprises housing 401.

In certain embodiments, optical holographic data storage medium 100 can be removeably disposed within housing 401. In the illustrated embodiment of FIG. 4A, optical holographic data storage medium 100 is releaseably attached to a drive servo mechanism comprising drive servo 440 and rotatable shaft 450. Drive servo 440 rotates rotatable shaft 450 thereby causing optical holographic data storage medium 100 to rotate also.

In the illustrated embodiment of FIG. 4A, optical holographic drive apparatus 400 further comprises drive controller 410. Drive controller 410 comprises processor 420, memory 430, and microcode 435 written to memory 430. Drive controller 410 is interconnected with drive servo 440 via communication link 460, and with motor/solenoid 476 via communication link 415. Drive controller 410, using processor 420 and microcode 435, can cause optical holographic data storage medium 100 to rotate at a first rotation rate, and can simultaneously cause input screen 520 (FIGS. 4A, 4B, 5, 6A, 6B) to rotate at a second rotation rate, wherein the first rotation rate may equal the second rotation rate, and wherein the first rotation rate may differ from the second rotation rate.

In certain embodiments, memory 430 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

In the illustrated embodiment of FIG. 4A, optical holographic drive apparatus 400 further comprises member 472 slidably disposed within tubular member 474, which is slidably disposed within motor assembly/solenoid 476. Drive controller 410 can cause solenoid/motor 476 to extend members 474 and 472 outwardly. In the illustrated embodiment of FIG. 4A, beam splitter 210, reflective spatial light modulator 310 (FIGS. 3, 4A, 4B, 6A, 6B), lasing device 405, lasing device source 480, optical sensor 490, and input screen 520 (FIGS. 4A, 4B, 5, 6A, 6B), are disposed on member 472. Member 472 in combination with, beam splitter 210, reflective spatial light modulator 310, lasing device 405, lasing device 480, optical sensor 490, and input screen 520, comprise holographic read/write head 470.

In certain embodiments, lasing device source 405 emits blue laser light. In certain embodiments, lasing device 405 comprises a gallium nitride laser and emits blue laser light having a wavelength of about 473 nm.

In certain embodiments, lasing device 480 emits red laser light. In certain embodiments, lasing device 480 comprises an AlGaInP laser which emits light having a wavelength between about 620-690 nm.

FIG. 4A shows optical holographic drive apparatus 400 being used to encode hologram 160 (FIGS. 2, 4A, 4B, 5, 6A, 6B) as an interference pattern in optical holographic data storage medium 100. FIG. 6B shows optical holographic drive apparatus 400 being used to decode the interference pattern comprising hologram 160.

Figure 6A:
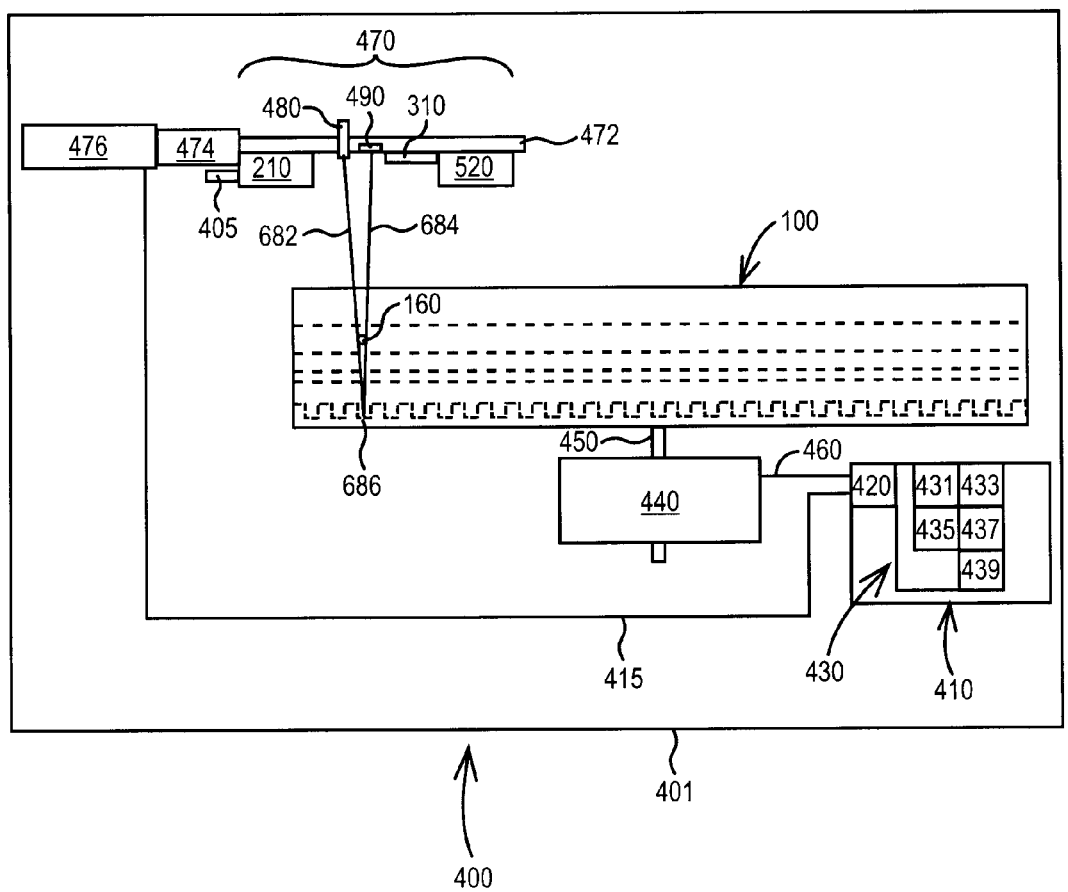
FIG. 6A is a block diagram showing the read/write head of FIG. 4B using a second lasing device to locate a storage address encoded in the optical data storage medium portion of Applicants' optical and holographic data storage medium.
Figure 6B:
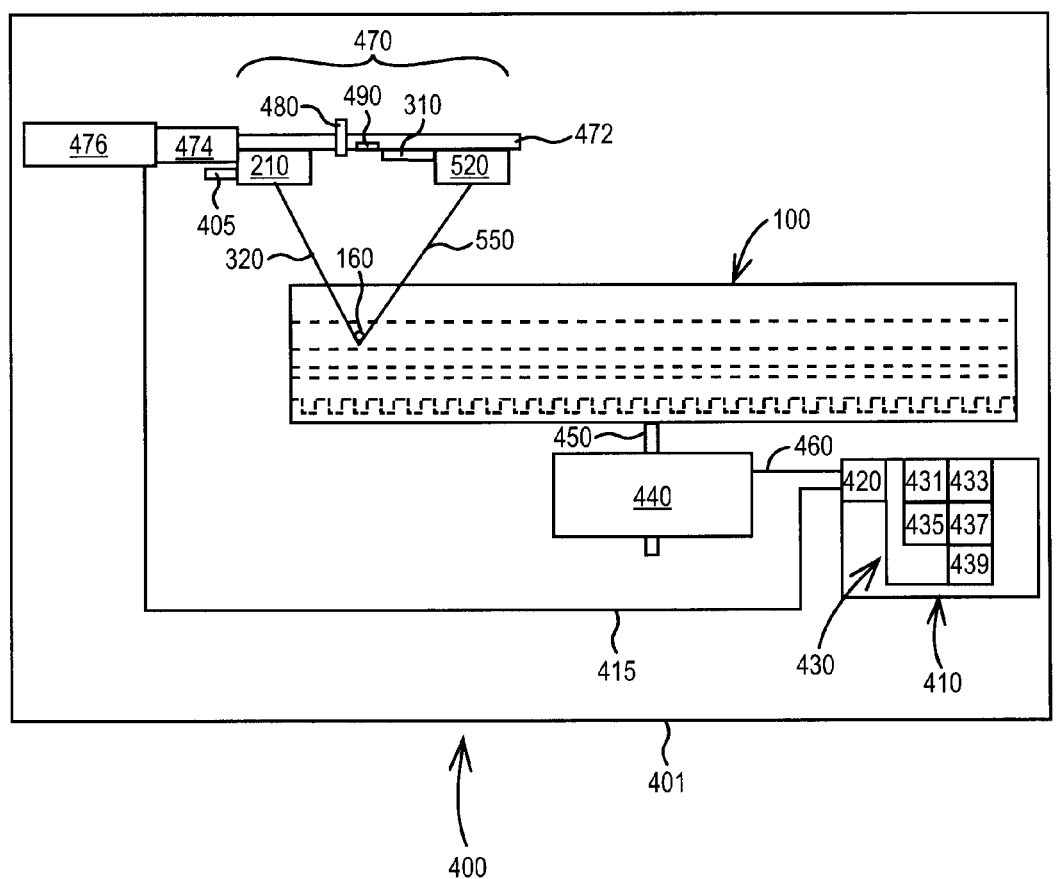
FIG. 6B is a block diagram showing the read/write head element of Applicants' optical/holographic drive using the first lasing device to reproduce a data image encoded as a hologram in Applicants' optical and holographic data storage medium.
Figure 7:
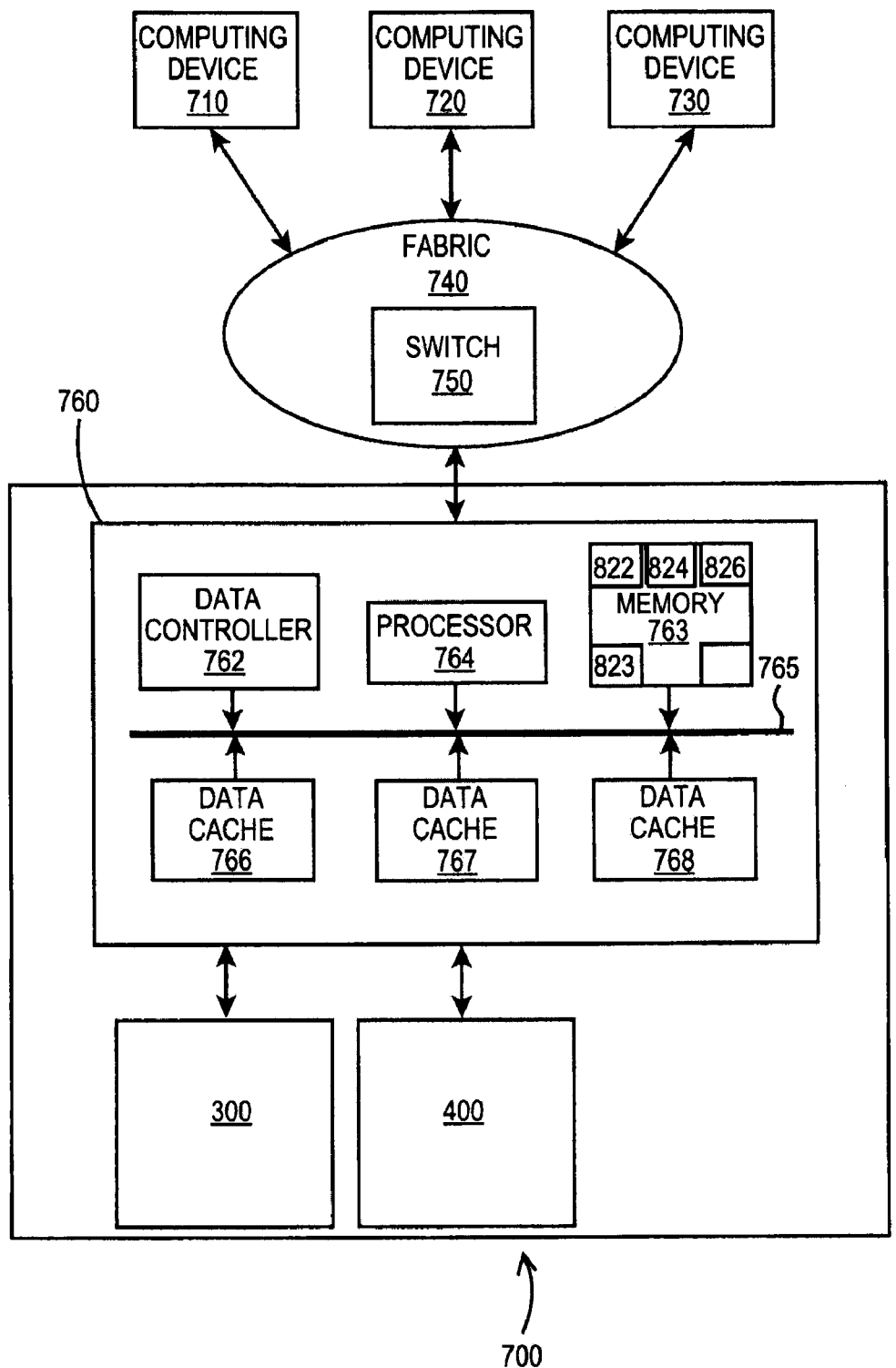
FIG. 7 is a block diagram showing one embodiment of Applicants' data storage and retrieval system.

FIG. 7 illustrates one embodiment of Applicants' data storage and retrieval system 700. In the illustrated embodiment of FIG. 7, data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises holographic data storage system 300 (FIGS. 3, 5) and/or optical holographic drive 400 (FIGS. 4A, 4B, 6A, 6B).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, Gigabit Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822, instructions 824, database 826, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded images. Those images are transferred to RSLM 310 (FIGS. 3, 4A, 4B, 6A, 6B).

Figure 1:
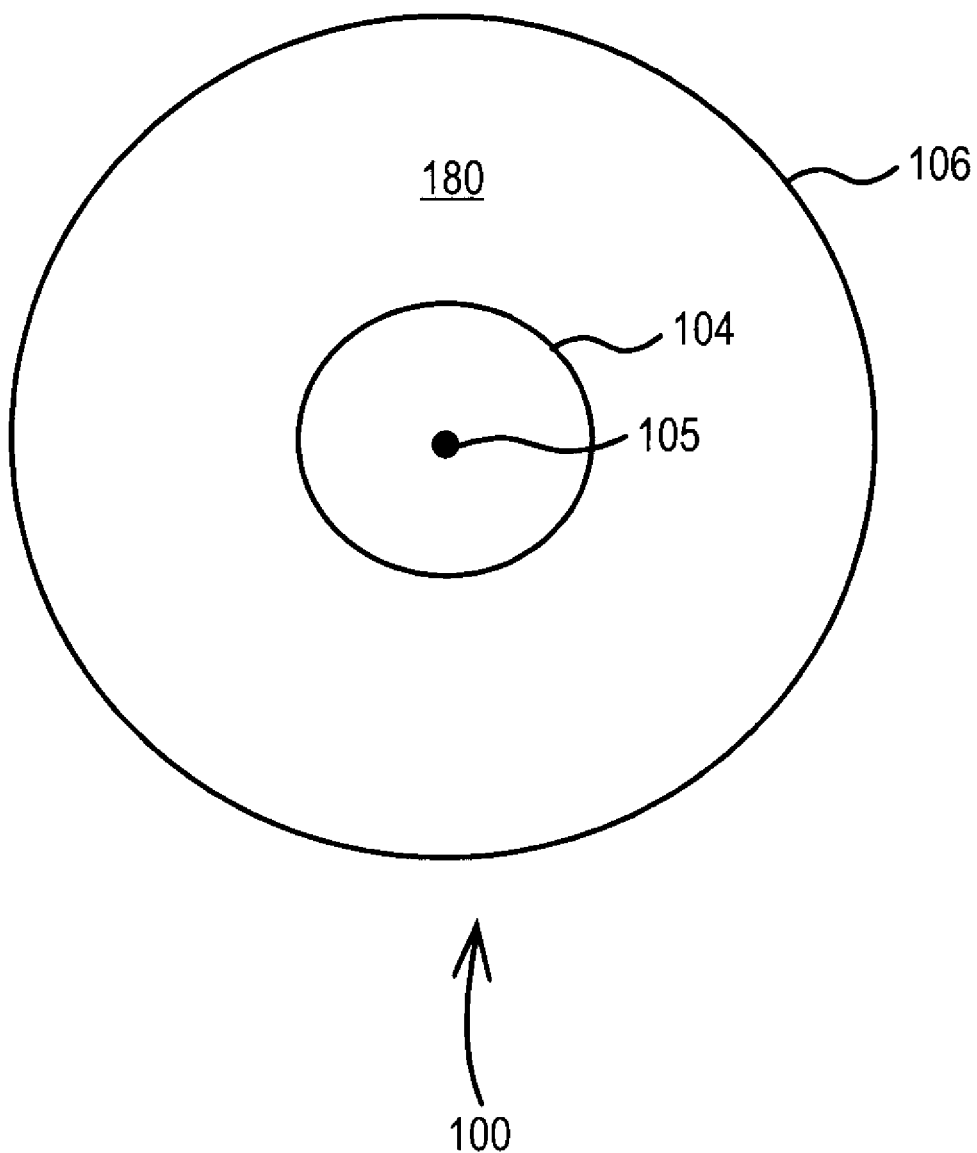
FIG. 1 is top view of Applicants' optical and holographic data storage medium.

FIG. 1 illustrates optical and holographic data storage medium 100 comprising geometric center-of-disk 105. A plurality of interference patterns can be encoded within optical holographic data-storage medium data zone 180, which lies between the inner radius $R_I$ 104 and the outer radius $R_O$ 106.

Figure 2:
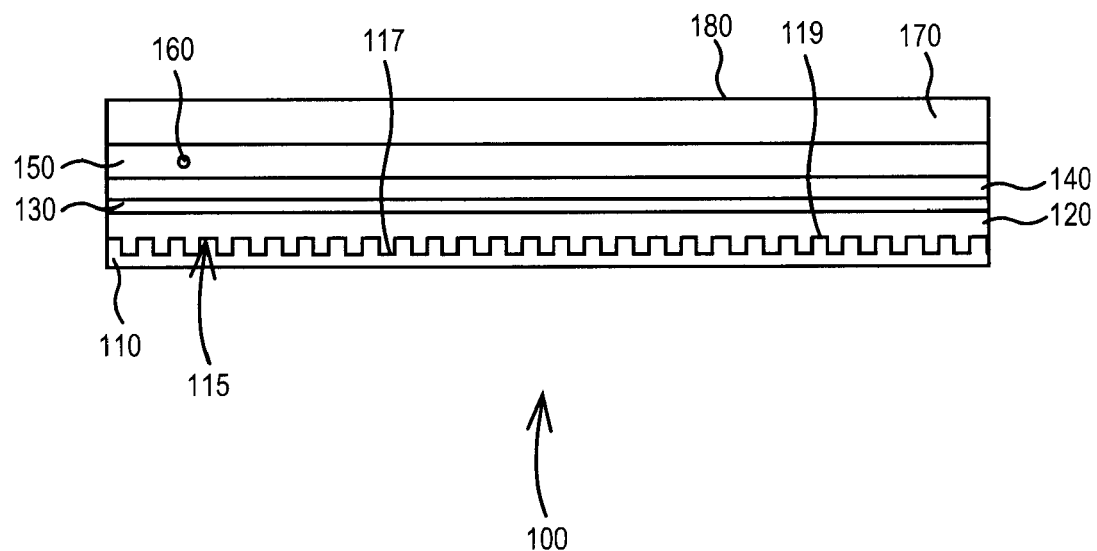
FIG. 2 is a cross-sectional view of the optical and holographic data storage medium of FIG. 1.

Referring now to FIG. 2, Applicants' optical holographic data storage medium 100 comprises optical data storage layer 115 (FIG. 2) formed in substrate 110. Applicants' optical holographic data storage medium 100 further comprises gap layer 120 disposed over optical data storage layer 115 (FIG. 2). Applicants' optical holographic data storage medium 100 further comprises dichroic mirror 130 (FIG. 2) disposed over gap layer 120. Applicants' dichroic mirror 130 reflects light comprising certain wavelengths, but transmits light having other wavelengths. More specifically, dichroic mirror 130 reflects the laser light emitted by lasing device 405 (FIGS. 4A, 4B, 6A, 6B) but does not reflect the laser light emitted by lasing device 480 (FIGS. 4A, 4B, 6A, 6B).

By "reflects the laser light" or "is reflected by," Applicants mean that less than about 10 percent of the laser energy incident on Applicants' dichroic mirror is transmitted through that dichroic mirror. By "does not reflect the laser light" or "is not reflected by," Applicants mean that more than about 90 percent of the laser energy incident on Applicants' dichroic mirror is transmitted through that dichroic mirror.

Applicants' optical holographic data storage medium 100 further comprises gap layer 140 disposed over dichroic mirror 130 (FIG. 2). Applicants' optical holographic data storage medium 100 further comprises holographic data storage layer 150 disposed over gap layer 140. Applicants' optical holographic data storage medium 100 further comprises cover layer 170 disposed over holographic data storage layer 150. The illustrated embodiment of FIG. 2 shows hologram 160 (FIGS. 2, 4A, 4B, 5, 6A, 6B) encoded as an interference pattern within holographic data storage layer 150.

Applicants' invention comprises a method to manage information using Applicants' optical holographic data storage medium 100. By "manage information using Applicants' optical holographic data storage medium," Applicants mean, subject to one or more alert messages encoded in the optical data storage layer, and subject to one or more write authorization keys encoded in the optical data storage layer, encode data as one or more holograms into the holographic data storage layer, and additionally or in the alternative, subject to one or more alert messages encoded in the optical data storage layer, and subject to one or more read authorization keys encoded in the optical data storage layer, decode one or more holograms encoded in the holographic data storage layer, wherein those one or more holograms comprise images of data.

FIG. 8 summarizes Applicants' method. Referring now to FIG. 8, in step 805 the method supplies an information storage medium comprising a holographic data storage layer and an optical data storage layer, such as Applicants' optical and holographic information storage medium 100.

In step 810, the method generates a request to encode data in, and/or decode data from, Applicants' optical holographic data storage medium. In certain embodiments, the request of step 810 is generated by a host computer, such as one or more of host computers 710 (FIG. 7), 720 (FIG. 7), and/or 730 (FIG. 7). Step 810 further comprises receiving that request. In certain embodiments, the request of step 810 is received by a storage controller, such as storage controller 760 (FIG. 7). In certain embodiments, the request of step 810 is received by a drive controller, such as drive controller 410 (FIGS. 4A, 4B, 6A, 6B).

In step 815, the method reads information from the optical data storage layer before reading data from, or writing data to, the holographic data storage layer. In certain embodiments, step 815 is performed by a storage controller, such as storage controller 760 (FIG. 7). In certain embodiments, step 815 is performed by a drive controller, such as drive controller 410 (FIGS. 4A, 4B, 6A, 6B).

In step 820, the method determines if the information read in step 815 comprises an alert message. In certain embodiments, step 820 is performed by a storage controller, such as storage controller 760 (FIG. 7). In certain embodiments, step 820 is performed by a drive controller, such as drive controller 410 (FIGS. 4A, 4B, 6A, 6B).

If the method determines in step 820 that the information of step 815 does not comprise an alert message, then the method transitions from step 820 to step 835. Alternatively, if the method determines in step 820 that the information of step 815 does comprise an alert message, the method transitions from step 820 to step 825 wherein the method provides that alert message to the requesting host computer of step 810. In certain embodiments, in step 825 the method displays the alert message on a visual display device. In certain of these embodiments, the requesting host computer is interconnected with a visual display device, and step 825 further comprises displaying the alert message on that host computer visual display device.

In certain embodiments, the alert message advises that the optical and holographic data storage medium must be disposed in an optical and holographic drive assembly in order to read data from, or write data to, that information storage medium. In certain embodiments, the alert message advises that one or more security keys are required in order to read data from, or write data to, that information storage medium.

In step 830, the method, having read the alert message written to the optical layer of the optical and holographic data storage medium, determines whether to continue processing the request of step 810. In certain embodiments, step 830 is performed by a system operator. In certain embodiments, step 830 is performed by a storage controller, such as storage controller 760 (FIG. 7). In certain embodiments, step 830 is performed by a drive controller, such as drive controller 410 (FIGS. 4A, 4B, 6A, 6B).

If the method elects not to continue in step 830, then the method transitions from step 830 to step 890 and ends. Alternatively, if the method elects in step 830 to continue, then the method transitions from step 830 to step 835 wherein the method determines if the request of step 810 comprises data to be stored in the optical and holographic data storage medium. In certain embodiments, step 835 is performed by a storage controller, such as storage controller 760 (FIG. 7). In certain embodiments, step 835 is performed by a drive controller, such as drive controller 410 (FIGS. 4A, 4B, 6A, 6B).

If the method determines in step 835 that the request of step 810 does not recite data to be stored in the optical and holographic data storage medium, then the method transitions from step 835 to step 855. Alternatively, if the method determines in step 835 that request of step 810 recites or comprises data to be stored in the optical and holographic data storage medium, then the method transitions from step 835 to step 840 wherein the method determines if the information of step 815 comprises a write authorization key. In certain embodiments, step 840 is performed by a storage controller, such as storage controller 760 (FIG. 7). In certain embodiments, step 840 is performed by a drive controller, such as drive controller 410 (FIGS. 4A, 4B, 6A, 6B).

If the method determines in step 840 that the information of step 815 does not comprise a write authorization key, then the method transitions from step 840 to step 850. Alternatively, if the method determines in step 840 that the information of step 815 comprises a write authorization key, then the method transitions from step 840 to step 845 wherein the method determines if the write authorization key permits data to be encoded in the holographic data storage layer. In certain embodiments, step 845 is performed by a storage controller, such as storage controller 760 (FIG. 7). In certain embodiments, step 845 is performed by a drive controller, such as drive controller 410 (FIGS. 4A, 4B, 6A, 6B).

If the method determines in step 845 that the write authorization key does not permit data to be encoded in the holographic data storage layer, then the method transitions from step 845 to step 855. Alternatively, if the method determines in step 845 that the write authorization key does permit data to be encoded in the holographic data storage layer, then the method transitions from step 845 to step 850 wherein the method encodes the data as one or more holograms in the holographic data storage layer. In certain embodiments, step 850 further comprises encrypting the data using an encryption key, such as encryption key 431 (FIGS. 4A, 4B, 6A, 6B) and/or encryption key 823 (FIG. 7).

In certain embodiments, step 850 is performed by a storage controller, such as storage controller 760 (FIG. 7). In certain embodiments, step 850 is performed by a drive controller, such as drive controller 410 (FIGS. 4A, 4B, 6A, 6B). The method transitions from step 850 to step 855.

In certain embodiments, step 850 further comprises determining a storage location for the hologram encoded in step 850. For example and referring now to FIG. 4B, after encoding hologram 160 (FIGS. 2, 4A, 4B, 5, 6A, 6B) into optical holographic data storage medium 100 using first laser energy provided by lasing device 405, lasing device 480, using second laser energy 482, scans optical data storage layer 115 (FIG. 2). dichroic mirror layer 130 (FIG. 2) is transparent to the second laser energy 482 provided by lasing device 480, and that second laser energy 482 passes through dichroic mirror layer 130 (FIG. 2) and strikes optical data storage layer 115 (FIG. 2). Drive controller 410 causes read/write head 470 to move bidirectionally, and as read/write head 470 moves the second laser light 482 incident on optical data storage layer 115 (FIG. 2) is selectively reflected backwardly as reflected second laser light 484. Sensor 490 detects both the presence or absence of reflected second laser light 484.

As those skilled in the art will appreciate, optical data storage layer 115 (FIG. 2) comprises "pits" and "lands". The pits and lands shown in FIG. 2 formed in optical data storage layer 115 (FIG. 2) have been greatly enlarged for illustrative purposes. In addition, the illustrated alternating pits and lands are again used for illustration purposes only.

If the incident second laser light 482 strikes a pit, such as pit 117 (FIG. 2), that incident energy is diffused within the pit, and no reflected second laser light 484 is generated. On the other hand, if the incident second laser light 482 strikes a land, such as land 119 (FIG. 2), then a reflected second laser light beam 484 results, and that reflected second laser light beam is detected by sensor 490. Not detecting a reflected second laser light beam is interpreted as a "0" encoded in the digital data storage layer. Detecting a reflected second laser light beam is interpreted as a "1" encoded in the digital data storage layer.

Optical data storage layer 115 (FIG. 2) is digitally encoded with a plurality of storage addresses. Each portion of the digital data storage layer is encoded with a storage address, and that storage address is associated with a corresponding portion of the holographic data storage layer disposed directly above.

In certain embodiments, the 2-dimensional surface of digital data storage layer 115 (FIG. 2) is divided into (N) sectors, wherein (N) is greater than or equal to 2. Each sector is then subdivided into (M) bits, wherein (M) is greater than or equal to 2. In these embodiments, each of the plurality of storage addresses comprises a coarse locator comprising the (j)th sector number, wherein (j) is greater than or equal to 1 and less than or equal to (N). Each of the plurality of storage addresses further comprises a fine locator comprising the (i)th bit disposed within the (j)th sector, wherein (i) is greater than or equal to 1 and less than or equal to (M).

As second laser light 482 in step 850 scans that portion of the optical data storage directly beneath the encoded hologram 160 (FIGS. 2, 4A, 4B, 5, 6A, 6B), the incident second laser light 482 reads the encoded storage address, and the method associates that encoded storage address with the encoded hologram. In certain embodiments, in step 850 an identifier is assigned to the hologram encoded in step 850, and that identifier and the storage address associated with the hologram encoded in step 850 are stored in a database, such as database 439 (FIGS. 4A, 4B, 6A, 6B), and/or database 826 (FIG. 7).

Referring once again to FIG. 8, in step 855 the method determines if the request of step 810 recites or comprises data to be decoded from the optical and holographic data storage medium. In certain embodiments, step 855 is performed by a storage controller, such as storage controller 760 (FIG. 7). In certain embodiments, step 855 is performed by a drive controller, such as drive controller 410 (FIGS. 4A, 4B, 6A, 6B).

If the method determines in step 855 that the request of step 810 does not recite data to be decoded from the optical and holographic data storage medium, then the method transitions from step 855 to step 890 and ends. Alternatively, if the method determines in step 855 that the request of step 810 recites data to be decoded from the optical and holographic data storage medium, then the method transitions from step 855 to step 860 wherein the method determines if the information of step 815 comprises a read authorization key. In certain embodiments, step 860 is performed by a storage controller, such as storage controller 760 (FIG. 7). In certain embodiments, step 860 is performed by a drive controller, such as drive controller 410 (FIGS. 4A, 4B, 6A, 6B).

If the method determines in step 860 that the information of step 815 does not comprise a read authorization key, then the method transitions from step 860 to step 880. Alternatively, if the method determines in step 860 that the information of step 815 comprises a read authorization key, then the method transitions from step 860 to step 870 wherein the method determines if the read authorization key permits data to be decoded from the holographic data storage layer. In certain embodiments, step 870 is performed by a storage controller, such as storage controller 760 (FIG. 7). In certain embodiments, step 870 is performed by a drive controller, such as drive controller 410 (FIGS. 4A, 4B, 6A, 6B).

If the method determines in step 870 that the read authorization key does not permit data to be decoded from the holographic data storage layer, then the method transitions from step 870 to step 890 and ends. Alternatively, if the method determines in step 870 that the read authorization key does permit data to be decoded from the holographic data storage layer, then the method transitions from step 870 to step 880 wherein the method decodes one or more holograms comprising images of the requested data. In certain embodiments, step 880 further comprises decrypting data using a decryption key, such as decryption key 433 (FIGS. 4A, 4B, 6A, 6B) and/or decryption key 825 (FIG. 7).

In certain embodiments, step 880 is performed by a storage controller, such as storage controller 760 (FIG. 7). In certain embodiments, step 880 is performed by a drive controller, such as drive controller 410 (FIGS. 4A, 4B, 6A, 6B).

In certain embodiments, step 880 comprises determining the storage address associated with the one or more holograms comprising images of the requested data. In certain embodiments, step 880 comprises locating in a database, such as database 826 (FIG. 7) and/or database 439 (FIGS. 4A, 4B, 6A, 6B), the one or more storage addresses associated with the identifier with the one or more holograms comprising images of the requested data.

As an example and referring now to FIG. 6A, if the storage address associated with encoded hologram 160 (FIGS. 2, 4A, 4B, 5, 6A, 6B) comprises the (j)th sector and the (i)th bit, then step 880 further comprises scanning the optical data storage layer 115 (FIG. 2) with second laser light 682, detecting the reflected second laser light 684, locating the (j)th sector, and then locating the (i)th bit disposed within the (j)th sector. In the illustrated embodiment of FIG. 6A, storage address 686 comprises the (j)th sector and the (i)th bit for locating hologram 160.

Referring now to FIG. 6B, step 880 then comprises directing reference beam 320 to that portion of holographic data storage layer 150 (FIG. 2) associated with the located storage address, generating reconstructed data beam 550, projecting that reconstructed data image 550 onto input screen 520, and capturing the data comprising that reconstructed data image.

In certain embodiments, individual steps recited in FIG. 8 may be combined, eliminated, or reordered.

In certain embodiments, Applicants' invention includes instructions, such as instructions 824 (FIG. 7), encoded in memory 763 (FIG. 7), and/or instructions 437 (FIGS. 4A, 4B, 6A, 6B) encoded in memory 430 (FIGS. 4A, 4B, 6A, 6B), where those instructions are executed by a processor, such as processor 764 (FIG. 7) and/or processor 420 (FIGS. 4A, 4B, 6A, 6B), to perform one or more of steps 810, 815, 820, 825, 830, 835, 840, 845, 850, 855, 860, 870, and/or 880, recited in FIG. 8.

In certain embodiments, Applicants' invention includes instructions residing in any other computer program product, where those instructions are executed by a computer external to, or internal to holographic data storage system 300 (FIGS. 3, 5), optical holographic drive 400 (FIGS. 4A, 4B, 6A, 6B), and/or data storage and retrieval system 700 (FIG. 7), to perform one or more of steps 810, 815, 820, 825, 830, 835, 840, 845, 850, 855, 860, 870, and/or 880, recited in FIG. 8. In either case, the instructions may be encoded in an information storage medium, i.e. a computer readable medium, comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to manage information, comprising the steps of:

supplying an optical and holographic information storage medium consisting of an optical data storage layer formed in a substrate and encoding one or more alert messages, a first gap layer disposed over said data storage layer, a dichroic mirror disposed over said gap layer, a second gap layer disposed over said dichroic mirror, a holographic data storage layer disposed over said second gap layer, and a cover layer disposed over said holographic data storage layer;

supplying an optical and holographic drive assembly comprising a drive controller, a drive servo mechanism comprising a drive servo in communication with said drive controller and a rotatable shaft wherein said drive servo rotates said rotatable shaft thereby causing said optical and holographic information storage medium to rotate, a solenoid in communication with said drive controller, a member slidably disposed within a tubular member, wherein said tubular member is slidably disposed within said solenoid wherein a first lasing device, a second lasing device, a reflective spatial light modulator, an optical sensor, and a beam splitter are disposed on said member, wherein said drive controller causes said optical sensor to rotate at the same rotation rate as said optical and holographic information storage medium, and wherein said beam splitter receives laser light from said first lasing device and directs a carrier beam in a first direction toward said reflective spatial light modulator and a reference beam in a second direction, wherein said first direction differs from said second direction;

reading information from said optical data storage layer before reading data from, or writing data to, said holographic data storage layer.

2. The method of claim 1, wherein said second lasing device emits second laser light, wherein said second laser light is not reflected by said dichroic mirror, said method further comprising the steps of:

transmitting said second laser light through said holographic data storage layer and through said dichroic mirror layer;

wherein said reading information from said optical data storage layer further comprises selectively reflecting said laser light off said optical data storage layer.

3. The method of claim 1, further comprising the steps of:
receiving a request from a host computer to manage data using said optical holographic data storage medium;
determining if said information comprises an alert message;
operative if said information comprises an alert message, providing said alert message to said host computer.

4. The method of claim 1, further comprising the steps of:
receiving data to be encoded in said holographic data storage layer;
determining if said information comprises a write authorization key;
operative if said information comprises a write authorization key, determining if said write authorization key permits encoding said data in said holographic data storage layer;

operative if said write authorization key permits encoding said data in said holographic data storage layer, encoding a hologram comprising an image of said data into said holographic data storage layer.

5. The method of claim 4, further comprising the steps of: providing an encryption key, encrypting said data using said encryption key; wherein said encoding step comprises encoding a hologram comprising an image of encrypted data into said holographic data storage layer.

6. The method of claim 4, wherein said first lasing device emits first laser light, and wherein said first laser light is reflected by said dichroic mirror layer wherein said encoding a hologram step further comprises:
forming a hologram comprising an image of said data using said first lasing device.

7. The method of claim 1, further comprising the steps of:
receiving a request to read data encoded in said holographic data storage layer;
determining if said information comprises a read authorization key;
operative if said information comprises a read authorization key, determining if said read authorization key permits data to be decoded from said holographic data storage layer;
operative if said read authorization key permits data to be decoded from said holographic data storage layer, selecting a hologram encoded in said holographic data storage layer, wherein said selected hologram comprises an image of said data;
decoding said selected hologram.

8. The method of claim 7, illuminating said selected hologram with said first laser light to form a reconstructed data beam;
projecting said reconstructed data beam onto said optical detector;
capturing said data from said reconstructed data beam.

9. The method of claim 8, further comprising the steps of:
supplying a decryption key;
wherein said capturing step comprises:
capturing encrypted data from said reconstructed data beam;
generating said data using said captured encrypted data and said decryption key.

10. The method of claim 8, wherein said second lasing device emits second laser light, wherein said second laser light is not reflected by said dichroic mirror, further comprising the steps of:
providing a database associating said selected hologram with a storage address;
transmitting said second laser light through said holographic data storage layer and through said dichroic mirror layer;
selectively reflecting said second laser light off said optical data storage layer;
detecting said selectively reflected second laser light; and
locating said storage address.

11. An article of manufacture comprising a drive controller, a drive servo mechanism in communication with said drive controller and comprising a drive servo and a rotatable shaft wherein said drive servo rotates rotatable shaft thereby causing said optical and holographic information storage medium to rotate, a solenoid in communication with said drive controller, a member slidably disposed within a tubular member, wherein said tubular member is slidably disposed within said solenoid wherein a first lasing device, a second lasing device, a reflective spatial light modulator, an optical sensor, and a beam splitter are disposed on said member, wherein said drive controller causes said optical sensor to rotate at the same rotation rate as said optical and holographic information storage medium, and wherein said beam splitter receives laser light from said first lasing device and directs a carrier beam in a first direction toward said reflective spatial light modulator and a reference beam in a second direction, wherein said first direction differs from said second direction, wherein said first direction differs from said second direction, said article of manufacture further comprising a computer readable medium having computer readable program code disposed therein to manage information using an optical and holographic information storage medium consisting of an optical data storage layer formed in a substrate, a first gap layer disposed over said data storage layer, a dichroic mirror disposed over said gap layer, a second gap layer disposed over said dichroic mirror, a holographic data storage layer disposed over said second gap layer, and a cover layer disposed over said holographic data storage layer, the computer readable program code comprising a series of computer readable program steps to effect:
reading information from said optical data storage layer before reading data from, or writing data to, said holographic data storage layer.

12. The article of manufacture of claim 11, wherein said laser light emitted by said second lasing device is not reflected by said dichroic mirror layer, said computer readable program code further comprising a series of computer readable program steps to effect:
transmitting said second laser light through said holographic data storage layer and through said dichroic mirror layer, wherein said second laser light is selectively reflected off said optical data storage layer;
wherein said computer readable program code to read information from said optical data storage layer further comprises a series of computer readable program steps to effect detecting said selectively reflected second laser light.

13. The article of manufacture of claim 11, said computer readable program code further comprising a series of computer readable program steps to effect:
receiving a request from a host computer to manage data using said optical holographic data storage medium;
determining if said information comprises an alert message;
operative if said information comprises an alert message, providing said alert message to said host computer.

14. The article of manufacture of claim 11, said computer readable program code further comprising a series of computer readable program steps to effect:
receiving data to be encoded in said holographic data storage layer;
determining if said information comprises a write authorization key;
operative if said information comprises a write authorization key, determining if said write authorization key permits encoding said data in said holographic data storage layer;
operative if said write authorization key permits encoding said data in said holographic data storage layer, encoding a hologram comprising an image of said data into said holographic data storage layer.

15. The article of manufacture of claim 14, wherein said article of manufacture further comprises an encryption key, said computer readable program code further comprising a series of computer readable program steps to effect:

encrypting said data using said encryption key;

wherein said computer readable program code to encode a hologram further comprises a series of computer readable program steps to effect encoding a hologram comprising an image of encrypted data into said holographic data storage layer.

16. The article of manufacture of claim 15, wherein said laser light emitted by said first lasing device is reflected by said-dichroic mirror layer, wherein said computer readable program code to effect encoding a hologram step further comprises a series of computer readable program steps to effect forming a hologram comprising an image of said data using said first lasing device.

17. The article of manufacture of claim 11, said computer readable program code further comprising a series of computer readable program steps to effect:

receiving a request to read data encoded in said holographic data storage layer;

determining if said information comprises a read authorization key;

operative if said information comprises a read authorization key, determining if said read authorization key permits data to be decoded from said holographic data storage layer;

operative if said read authorization key permits data to be read from said holographic data storage layer, selecting a hologram encoded in said holographic data storage layer, wherein said selected hologram comprises an image of said data;

decoding said selected hologram.

18. The article of manufacture of claim 17, wherein said computer readable program code to decode said selected hologram further comprises a series of computer readable program steps to effect illuminating said selected hologram with said laser light emitted by said first lasing device to form a reconstructed data beam and projecting said reconstructed data beam onto an optical detector; and capturing said data from said reconstructed data beam.

19. The article of manufacture of claim 18, wherein said article of manufacture further comprises a decryption key, said computer readable program code to capture data further comprising a series of computer readable program steps to effect:

capturing encrypted data from said reconstructed data beam;

generating said data using said captured encrypted data and said decryption key.

20. The article of manufacture of claim 18, wherein said second lasing device emits second laser light, wherein said second laser light is not reflected by said dichroic mirror and wherein said article of manufacture further comprises a database associating said selected hologram with a storage address, said computer readable program code further comprising a series of computer readable program steps to effect:

transmitting said second laser light through said holographic data storage layer and through said dichroic mirror layer such that said second laser light is selectively reflected off said optical data storage layer;

detecting said selectively reflected second laser light; and locating said storage address.

* * * * *